(12) United States Patent
Vorel

(10) Patent No.: US 11,597,537 B2
(45) Date of Patent: Mar. 7, 2023

(54) LAUNCH VEHICLE WITH SOLAR CELLS, MANUFACTURING METHOD AND TRANSPORT METHOD

(71) Applicant: ArianeGroup GmbH, Taufkirchen (DE)

(72) Inventor: Michal Vorel, Taufkirchen (DE)

(73) Assignee: ARIANEGROUP GMBH, Taufkirchen (DE)

( * ) Notice: Subject to any disclaimer, the term of this patent is extended or adjusted under 35 U.S.C. 154(b) by 672 days.

(21) Appl. No.: 16/186,732

(22) Filed: Nov. 12, 2018

(65) Prior Publication Data
US 2019/0144144 A1   May 16, 2019

(30) Foreign Application Priority Data

Nov. 13, 2017  (DE) ..................... 10 2017 126 609.7

(51) Int. Cl.
*B64G 1/44*  (2006.01)
*B64G 1/00*  (2006.01)
*H02S 20/00*  (2014.01)
*H02S 40/36*  (2014.01)

(52) U.S. Cl.
CPC ............... *B64G 1/002* (2013.01); *B64G 1/44* (2013.01); *B64G 1/443* (2013.01); *H02S 20/00* (2013.01); *H02S 40/36* (2014.12)

(58) Field of Classification Search
CPC . B64G 1/002; B64G 1/42; B64G 1/44; B64G 1/443; B64G 2001/1092; B64D 2211/00; H02S 10/40; H02S 20/00
See application file for complete search history.

(56) References Cited

U.S. PATENT DOCUMENTS

| 3,204,889 A | * | 9/1965 | Schwinghamer | ...... B64G 1/443 244/171.1 |
| 3,565,719 A | * | 2/1971 | Dupont | ..................... B32B 3/12 156/212 |
| 3,809,337 A | * | 5/1974 | Andrews | ................ B64G 1/281 244/172.7 |

(Continued)

FOREIGN PATENT DOCUMENTS

DE   69409493 T2   7/1998
DE   10351713 A1   6/2005
(Continued)

OTHER PUBLICATIONS

Gonzalez-Blazquez, A., and A. Constanzo. "First Test Firing of an Ariane-5 Production Booster." ESA Bulletin (2000): 62-65. (Year: 2000).*

(Continued)

*Primary Examiner* — Richard Green
*Assistant Examiner* — Michael A. Fabula
(74) *Attorney, Agent, or Firm* — Greer, Burns & Crain, Ltd.

(57) ABSTRACT

A launch vehicle to transport at least one payload into an earth orbit, wherein the launch vehicle comprises a plurality of solar cells on its outer surface. Furthermore, a manufacturing method for a launch vehicle with a plurality of solar cells on its outer surface and a transport method for at least one payload using a launch vehicle with a plurality of solar cells on its outer surface are provided.

13 Claims, 2 Drawing Sheets

(56) References Cited

U.S. PATENT DOCUMENTS

| | | | | |
|---|---|---|---|---|
| 3,817,477 | A | * | 6/1974 | Luther .................. B64G 1/281 244/172.7 |
| 3,817,481 | A | * | 6/1974 | Berks .................... B64G 1/443 244/172.7 |
| 3,863,870 | A | * | 2/1975 | Andrews ............... B64G 1/443 244/172.7 |
| 4,133,501 | A | * | 1/1979 | Pentlicki ............... B64G 1/443 244/172.6 |
| 4,554,038 | A | * | 11/1985 | Allard ...................... B32B 7/12 156/196 |
| 4,768,738 | A | * | 9/1988 | Weinert .................. H01L 51/42 244/53 R |
| 5,006,179 | A | * | 4/1991 | Gaddy ............... H01L 31/0508 136/244 |
| 5,683,060 | A | * | 11/1997 | Iturralde ................. B64B 1/00 244/165 |
| 5,798,574 | A | * | 8/1998 | Coronel ................. B64G 1/428 307/9.1 |
| 6,484,973 | B1 | | 11/2002 | Scott |
| 6,799,742 | B2 | * | 10/2004 | Nakamura ............ B64G 1/443 136/244 |
| 7,108,228 | B1 | * | 9/2006 | Marshall ............... B64C 39/001 244/158.1 |
| 8,459,596 | B2 | * | 6/2013 | Im .......................... B64G 1/002 244/158.1 |
| 8,469,313 | B2 | * | 6/2013 | Dong ................. H01L 31/0236 244/130 |
| 8,511,617 | B2 | * | 8/2013 | Caplin .................... B64G 1/242 244/173.1 |
| 9,079,673 | B1 | | 7/2015 | Steele et al. |
| 9,957,037 | B2 | * | 5/2018 | Cornew ................. B64D 27/24 |
| 10,155,598 | B2 | * | 12/2018 | Clay ....................... B64G 1/60 |
| 10,263,131 | B2 | * | 4/2019 | Aiken ................ H01L 31/0504 |
| 10,903,380 | B1 | * | 1/2021 | Wrosch ................. H01L 31/048 |
| 2002/0066828 | A1 | * | 6/2002 | Nakamura ............ B64G 1/443 244/172.7 |
| 2005/0258306 | A1 | * | 11/2005 | Barocela ................. B64C 39/10 244/30 |
| 2006/0049301 | A1 | * | 3/2006 | Yam .......................... B64B 1/14 244/5 |
| 2008/0237399 | A1 | | 10/2008 | Caplin et al. |
| 2013/0002015 | A1 | * | 1/2013 | Gatzke ................... B64D 41/00 307/9.1 |
| 2014/0124627 | A1 | * | 5/2014 | Clay ........................ B64G 1/60 244/159.3 |
| 2015/0287865 | A1 | * | 10/2015 | Aiken ................... H01L 31/044 136/251 |
| 2016/0099363 | A1 | * | 4/2016 | Whetsel ................ H01L 31/052 244/123.1 |
| 2017/0021948 | A1 | * | 1/2017 | Yehezkel ................ B64G 1/10 |
| 2017/0214247 | A1 | | 7/2017 | Hyland et al. |
| 2018/0273170 | A1 | * | 9/2018 | D'Sa ..................... B64C 39/024 |
| 2019/0322376 | A1 | * | 10/2019 | Pan ...................... H01L 31/048 |
| 2020/0365966 | A1 | * | 11/2020 | Honour .................. H02S 10/40 |
| 2020/0366237 | A1 | * | 11/2020 | Hernandez Bahlsen .................... H02S 40/36 |

FOREIGN PATENT DOCUMENTS

| | | |
|---|---|---|
| EP | 0665162 A1 | 8/1995 |
| WO | 2005118394 A1 | 12/2005 |
| WO | 2016014869 A2 | 1/2016 |

OTHER PUBLICATIONS

Singh, Priyanka, and Nuggehalli M. Ravindra. "Temperature dependence of solar cell performance—an analysis." Solar energy materials and solar cells 101 (2012): 36-45. (Year: 2012).*

Wang, Xiao-Yen, James Yuko, and Brian Motil. "Ascent heating thermal analysis on the spacecraft adaptor (SA) fairings and the interface with the crew launch vehicle (CLV)." 2008 Thermal and Fluids Analysis Workshop. No. NASA/TM-2009-215474. 2009. (Year: 2009).*

European Search Report for corresponding European Patent Application No. 18205255 dated Mar. 18, 2019.

New Zealand First Examination Report for corresponding New Zealand Patent Application No. 748256 dated Apr. 15, 2019.

B. Brown, "Why does NASA not cover its spaceship with solar panels to absorb extra energy?" Jul. 18, 2016, 5 pages.

Wikipedia, Dragon 2, http://en.wikipedia.org/w/index.php?title=Dragon_2&oldod=809305995.

Anonymous, "Crew Dragon: Dragon V2/Crew Dragon," eoPortal Directory, 7 pages.

Youtube SpaceX DragonV2 Flight Animation, 2 pages.

Web Archive, "How Will Dragon v2's Solar Panels Be Protected During Launch on Top of Falcon 9?" 2 pages.

German Office Action for corresponding German Patent Application No. 102017126609.7 dated Nov. 8, 2018.

B. Brown, "Why does NASA not cover its spaceships with solar panels to absorb extra energy?" www.quora.com/why-does-NASA-not-cover-its-spaceships-with-solar-panels-to-absorb-extra-energy, Jul. 18, 2016.

Wikipedia, "Dragon 2" https://en.wikipedia.org/w/index.php?title=Dragon_2&oldid=809305995, San Francisco, CA, Nov. 8, 2017.

* cited by examiner

Fig. 3

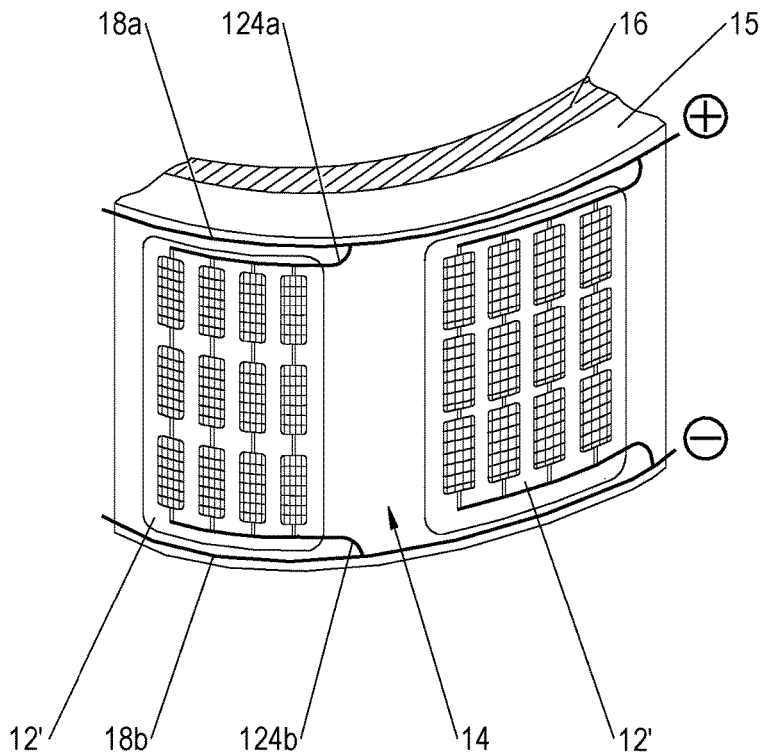

Fig. 4

| Attaching a plurality of solar cells to an outer surface of the launch vehicle wherein at least one of the solar cells is set into at least one depression located in an insulation of the launch vehicle | ⇢ | Attaching at least one of the plurality of solar cells to a surface of an upper stage when manufacturing the upper stage, or  Attaching at least one of the plurality of solar cells to the surface of the upper stage during an assembly process, in which two or a plurality of stages of the multistage rocket are assembled |

Fig. 5

| A launch vehicle to transport at least one payload into an earth orbit, wherein the launch vehicle comprises a plurality of solar cells on its outer surface, wherein the plurality of solar cells comprises at least one solar cell, which is configured to be connected in a detachable manner to at least one of an electrical or an electronic component of at least one of a transported payload or a payload to be transported; or wherein the plurality of solar cells comprises at least one solar cell, which is set up to be connected in a detachable or in a permanent manner to at least one accumulator, which is connected or is to be connected in a detachable manner to at least one of an electrical or an electronic component of at least one of a transported payload or a payload to be transported, wherein at least one of the solar cells is set into at least one depression located in an insulation of the launch vehicle, wherein the payload is transported using the launch vehicle from a surface of the earth into an earth orbit | ⇢ | Connecting at least one of an electrical or an electronic component of the payload to at least one electrical connection of the plurality of solar cells and an accumulator connected to the plurality of solar cells | ⇢ | Supplying at least one electrical or electronic component during transport with energy obtained from the plurality of solar cells by means of solar radiation |

LAUNCH VEHICLE WITH SOLAR CELLS, MANUFACTURING METHOD AND TRANSPORT METHOD

CROSS-REFERENCES TO RELATED APPLICATIONS

This application claims the benefit of the German patent application No. 10 2017 126 609.7 filed on Nov. 13, 2017, the entire disclosures of which are incorporated herein by way of reference.

BACKGROUND OF THE INVENTION

The present invention relates to a launch vehicle to transport at least one payload into an earth orbit, a method to manufacture a launch vehicle and a method to transport a payload into an earth orbit.

Launch vehicles are used in aerospace to transport payloads, such as, in particular, components or supply material for a space station or also satellites, from the earth's surface into a designated orbit. The respective payload is arranged usually behind a payload fairing of the launch vehicle and protected against damaging factors during launch and/or flight by means of this.

The launch vehicle can, in particular, be designed as a multistage rocket, which can jettison so-called "lower stages" with empty fuel tanks or propulsion units that are no longer required so that only a relatively light so-called "upper stage" of the rocket has to fly to the designated orbit. Due to the reduction of mass, in this way, a higher orbit can be reached. In particular, the payload fairing can be capable of being jettisoned after the rocket exits the atmosphere.

The launch vehicle or also a transported payload generally contains electrical and electronic components that have to be supplied with electrical energy during the transport flight. For this purpose, batteries are usually provided in the launch vehicle.

SUMMARY OF THE INVENTION

An object of the present invention is to provide an improved technology, by means of which an energy supply to electric and/or electronic components can be implemented during a transport flight of a launch vehicle.

A launch vehicle according to the invention serves to transport at least one payload (which, for example, can be supply material or a component for a space station or be a satellite) into an earth orbit. On its outer surface, the launch vehicle comprises a plurality of solar cells.

A manufacturing method according to the invention serves to manufacture a launch vehicle, for example, a launch vehicle according to the invention in accordance with one of the embodiments disclosed in this document. The manufacturing method entails attaching a plurality of solar cells to an outer surface of the launch vehicle.

A transport method according to the invention entails transporting a payload by means of a launch vehicle according to the invention (in accordance with one of the embodiments disclosed in this document) from the earth's surface into an earth orbit.

The solar cells arranged on the outer surface of the launch vehicle according to the invention make absorbing energy in the form of sunlight and converting it into electrical energy possible during a transport flight of the launch vehicle. A number of batteries to be carried in the launch vehicle, which are usually heavy, can be decreased by means of this, which means a favorable reduction of mass.

The solar cells are preferably connected to an electric and/or electronic component, in particular, to at least one energy storage mechanism (accumulator) of the launch vehicle or a payload to be carried.

If the payload is a satellite, for example, which is folded out and/or closed in its orbit under the use of electrical energy, the energy required for this can be at least partially obtained during the transport flight by means of the solar cells and stored in at least one accumulator. Analogously, the energy required for docking onto a space station and/or for unloading the payload and/or the energy required for maintaining operational readiness of at least one carried unit can be fully or partially obtained during the transport flight by means of the solar cells and/or stored in at least one accumulator.

In accordance with a special exemplary embodiment of a transport method according to the invention, a transported payload is a satellite and the transport method entails charging at least one accumulator by means of a plurality of solar cells on the launch vehicle during transport, as well as launching the satellite into the designated orbit (in particular) by means of electrical energy from the accumulator.

In accordance with an alternative variant of a transport method according to the invention, a transported payload is a component or a cargo, which is brought to a space station and the transport method entails charging at least one accumulator by means of a plurality of solar cells on the launch vehicle during transport, as well as docking and/or unloading the component or cargo at the space station (in particular) by means of electrical energy from the accumulator.

Favorably, an embodiment of the present invention, where the launch vehicle is designed as a multistage rocket and where the plurality of solar cells are arranged on an upper stage (with reference to a series of ignitions taking place at a second or higher stage of the multistage rocket). This upper stage preferably contains the payload to be transported and, when flying, is subjected to direct solar radiation most of the time during the flight.

Preferably, embodiment variants of a manufacturing method according to the invention are favorable where, when manufacturing the upper stage, one or a plurality of the solar cells is/are attached to its surface and/or where one or a plurality of solar cells is/are attached to the surface of the upper stage during an assembly process, in which two or a plurality of stages of the multistage rocket are assembled.

In accordance with a preferred embodiment, one or a plurality of the solar cells is/are arranged on an insulation of the launch vehicle, in particular, on an insulation of at least one fuel tank and/or at least one transitional structure (which can be formed between two or a plurality of stages) of the launch vehicle. The outer surface, on which the solar cells are arranged, is at least partially a surface of the insulation, which can be designed as an insulation layer. The insulation can be fully or partially made of polyurethane (in particular polyurethane foam) and/or a cork material.

While the solar cells absorb the incoming solar energy and do not or only partially pass into the material lying behind, they prevent or decrease an undesired heating of the fuel in the tank, in particular, in the case of this embodiment variant, thereby acting as (another) insulation for the fuel of the launch vehicle. In particular, in the case of cryogenic fuels, this insulating function is particularly favorable.

Favorably, an embodiment where the one or a plurality of solar cells is/are introduced (e.g., glued) into a depression of the insulation (for example, of the fuel tank or the transitional structure).

The plurality of solar cells can form one or a plurality of photovoltaic modules (which are also referred to as "solar module" or as "solar panels") and be integrated into this/these; such a photovoltaic module can comprise a plurality of solar fields, into which a plurality of solar cells can be respectively consolidated. In particular, a plurality of solar cells (and/or, if applicable, a plurality of solar fields) can be connected in series and/or a plurality of solar cells (or solar fields) can be connected in parallel.

The photovoltaic module or the photovoltaic modules can each comprise a plurality of connection lines, which can be bundled into a cable harness. Such a cable harness can be connected to at least one electrical and/or electronic component (in particular, to an accumulator) of the launch vehicle and/or of a transported payload in a permanent or detachable manner by means of an appropriate connection.

In accordance with a favorable embodiment of the present invention, a launch vehicle comprises at least two connection lines, which are connected or are to be connected (in a permanent or detachable manner) to a respective pole of an electrical and/or electronic component (e.g., at least one accumulator) of the launch vehicle and/or of a transported payload. Thereby, the plurality of solar cells can be connected or capable of being connected to two different connection lines. The at least two connection lines can be guided adjacent to one another, for example, adjoined to one another (in particular, integrated into a common connection cable) or run at a distance from one another, for example, in such a way that at least one part of the plurality of solar cells is arranged between the at least two connection lines.

In particular, a photovoltaic module comprising the plurality of solar cells (or a plurality of photovoltaic modules comprising the plurality of solar cells) can comprise two connection lines respectively, of which a first one is connected to one of the connection lines (and thereby, be connected to a first one of the poles) and a second one is connected to another one of the connection lines (and thereby, being connected to a second one of the poles of the electrical and/or electronic component, in particular, of the accumulator.)

One or a plurality of the at least two connection lines can comprise at least one section, which runs on and outer side of the launch vehicle, in particular, along its outer surface; such a section can surround the launch vehicle in a ring-like manner for example, and/or it can be glued on the outside onto an/the insulation of the launch vehicle (in particular, at least one tank and/or one transitional structure). In addition or as alternative, one or a plurality of the connection line(s) can comprise a section, which runs behind a surface material of the launch vehicle, in particular, behind an outer insulation, for example between an outer insulation layer and a tank or a transitional structure of the launch vehicle.

The outer surface, on which the plurality of solar cells is arranged preferably lies in an essentially circular-cylindrical-shaped section of the launch vehicle. In particular, thereby, the solar cells can be arranged in a wreath-like manner around the launch vehicle. In accordance with a special exemplary embodiment where, as mentioned, the solar cells are integrated into a plurality of photovoltaic modules, the photovoltaic modules can be arranged around the launch vehicle (e.g., at least partially at regular intervals). In this way, solar radiation can be used from different sides to obtain electrical energy.

One or a plurality of solar cells (or related photovoltaic modules) can be applied to a smooth surface area of the launch vehicle (e.g., glued). In particular, a conventional surface structure as a substrate for the solar cells does not need to be specially designed for their arrangement according to the invention. In addition or as an alternative, one or a plurality of solar cells (or related photovoltaic modules) can be set into one or a plurality of depression(s) in the outer surface (e.g., glued). In this way, a particularly solid attachment be achieved and in addition, unevenness in the outer surface and, thereby, air resistance can be minimized.

The plurality of solar cells together can comprise an irradiation surface for sunlight (i.e., a usable surface, which is set up to absorb sunlight for conversion into energy) of at least 10 m$^2$ preferably at least 20 m$^2$, or even at least 50 m$^2$. In this way, a correspondingly high degree of efficiency is achieved.

One or a plurality of solar cells can contain mono- or polycrystalline silicon as a semiconductor material.

In accordance with a favorable embodiment, one or a plurality of the solar cells (or, in the case of corresponding embodiments, one or a plurality of photovoltaic module(s)) is/are designed as pliable solar film. Such solar films are particularly easy to handle and must be attached to the outer surface of the launch vehicle.

One or a plurality of solar cells (or the photovoltaic module(s)) can be designed as thin-film module(s), which can comprise a semiconductor material with a layer thickness of max. 2 µm or max. 1.5 µm. The semiconductor material can, in particular, be applied to a plastic film, for example, be applied via vapor deposition:

This makes simple processing as well as a favorable low mass (for each irradiation surface) possible.

Such a thin-film module as a semiconductor material can contain one or a plurality of layers made of amorphous and/or microcrystalline silicon, copper-indium-gallium diselenide (so-called "CIS or CIGS thin-film modules") or cadmium telluride (CdTe).

In addition or as an alternative, one or a plurality of the solar cells can be organically manufactured, meaning carbon-based, for example, as an organic solar film.

In accordance with a favorable embodiment of the present invention, the plurality comprises at least one solar cell, which is or is to be connected in a detachable manner to an electrical and/or an electronic component (e.g., an accumulator) of the transported a payload. In addition or as an alternative, the plurality can comprise at least one solar cell, which is connected or is to be connected to at least one accumulator in a permanent or detachable manner, which is, in itself, connected in a detachable manner to an electrical and/or an electronic component of the transported payload (and that can belong to the launch vehicle and can be located outside of the payload). In this way, and energy supply of the electrical and/or an electronic component(s) of the payload is respectively made possible by means of the solar cells. In particular, the payload (or its electrical and/or electronic component(s)) can thereby be supplied with energy by the solar cells during the entire ballistic phase.

A transport method according to the invention can, in particular, entail connecting at least one electrical and/or at least one electronic component of the transported payload to the solar cells and/or to at least one accumulator connected to the solar cells, as well as supplying at least the component (s) of the payload with energy obtained by means of solar radiation on the plurality of solar cells during transport. The connection preferably takes place before launching the launch vehicle. In accordance with a favorable embodiment, a transport method according to the invention furthermore entails detaching the respective component(s) of the payload from the solar cells and from the at least one accumulator connected to the solar cells, and, afterwards, unloading the payload from the launch vehicle.

BRIEF DESCRIPTION OF THE DRAWINGS

In the following, a preferred exemplary embodiment of the invention will be explained in detail based on two drawings. It is to be understood that individual elements and components can also be combined in a different manner than what is shown. Reference numbers for elements corresponding to each other are used across all figures and, if applicable, not newly described for each figure.

On a schematic level:

FIG. 3 shows a detailed view of a section of a launch vehicle with a second possible conduit.

FIG. 4 is a flowchart corresponding to a method of the present disclosure.

FIG. 5 is a flowchart corresponding to a method of the present disclosure.

DETAILED DESCRIPTION OF THE PREFERRED EMBODIMENTS

Figure 1:
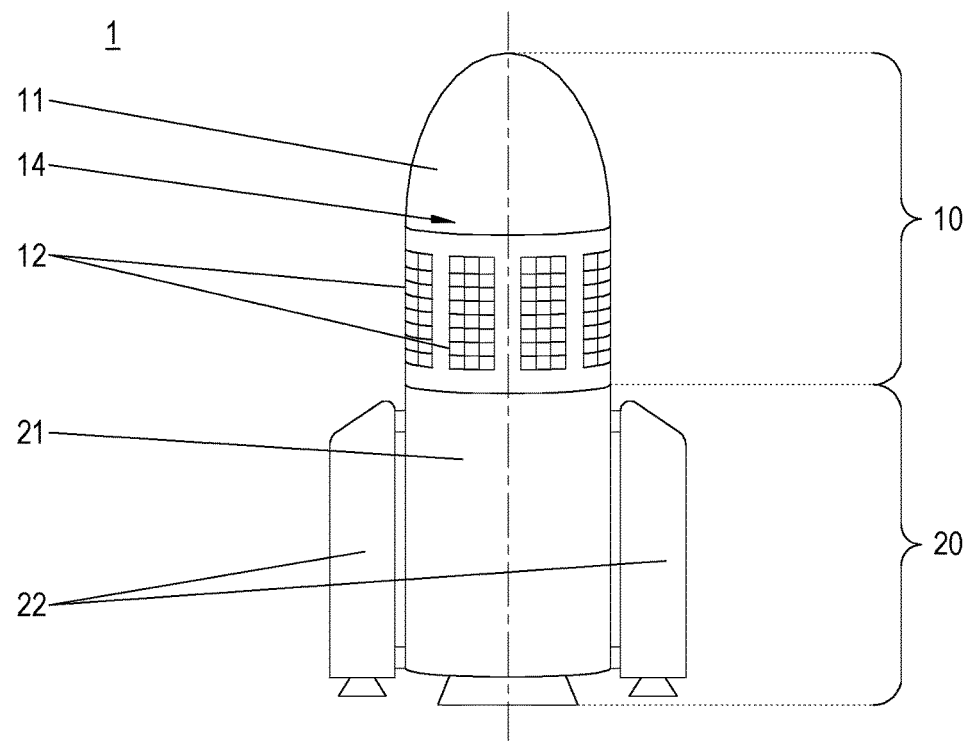
FIG. 1 shows a launch vehicle in accordance with an exemplary embodiment of the present invention.

In FIG. 1, a launch vehicle 1 in accordance with an exemplary embodiment is shown in a simplified manner. The launch vehicle 1 is designed as a multistage rocket with an upper stage 10 and a detachable propulsion stage 20, which comprises a propulsion unit 21 and boosters 22, which, in turn, can be detached from it. Within the interior space of the upper stage 10, behind a payload bearing 11, a payload (which is not visible in the figure), such as one or a plurality of satellite(s), one or a plurality of component (s) for space station and/or supply material for space station can be transported from the earth's surface into a designated earth orbit.

In a circular-cylindrical-shaped section of the upper stage 10, a plurality of photovoltaic modules 12 are arranged around the launch vehicle 1 in a wreath-like manner.

Figure 2:
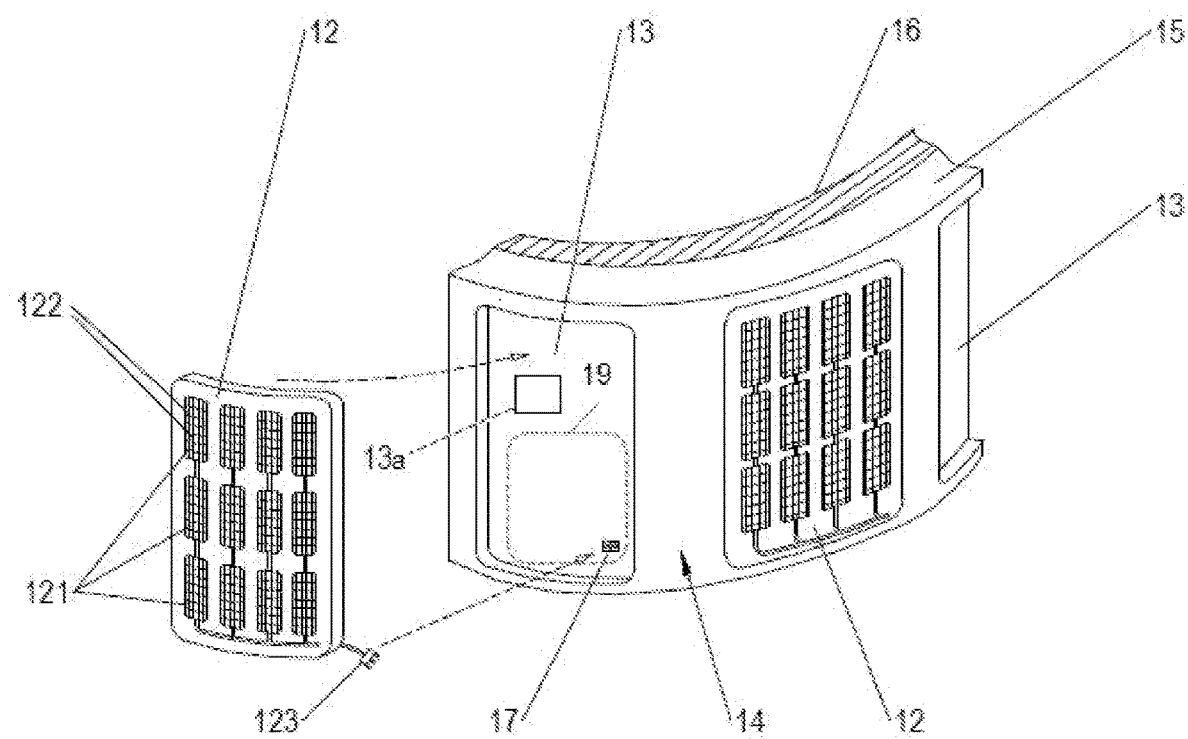
FIG. 2 shows a detailed view of a possible layer structure of a section of the launch vehicle in accordance with FIG. 1 with a first conduit.

In FIG. 2, a detailed view of a photovoltaic module 12 arrangement according to the invention of a design variant of the present invention is shown: The photovoltaic modules 12 each comprise a plurality of solar fields 121, which are partly connected in series and partly connected in parallel, which, in themselves, each comprise a plurality of solar cells 122. The photovoltaic modules 12 are set into related depressions 13 in the surface 14 of the launch vehicle, for example being glued in by glue 13a. Thereby, the depressions 13 are set into an insulation 15 on the fuel tank or on the transitional structure 16 designed as a layer, from which part of the outer wall can be viewed in FIG. 2. The insulation 15 prevents or reduces at least an undesired heating of the fuel in the fuel tank. The solar cells 122, which are set up to absorb solar radiation and convert it into electrical energy, also act as thermal insulation.

The solar cells 122 of the individual photovoltaic modules 12 each comprise a common cable harness 123, which is set up to be connected to a connection 17 in the respective depression 13. In this way, the electrical current generated by the solar cells can be added through the insulation 15 by means of a connection cable of the corresponding electrical and/or electronic component (in particular, an accumulator 19) behind the outer wall of the launch vehicle 1 (or the upper stage 10) so that, for example, a transported payload (or an electrical and/or electronic component of the payload) can be supplied with energy. In the embodiment shown in FIG. 2, the connection cable runs behind the outer surface of the launch vehicle and can therefore not be viewed in the figure.

FIG. 3 shows a possible section of a launch vehicle according to the invention with an alternative conduit: Thereby, the photovoltaic modules 12' can, in turn, be set into related depressions or they can, for example as a solar film—in particular, when designed with a thin-film module, be applied to a smooth area of the surface of the launch module (e.g., glued on) (not shown).

Thereby, the photovoltaic modules 12' each comprise two connection lines 124a, 124b, to which they (and thereby, the plurality of solar cells 122) can be connected to a related connection line 18a or 18b respectively. Thereby, the connection lines 18a, 18b at least in one section on the outer side of the launch vehicle, in particular, on an outer surface of the insulation 15, onto which they can be glued for example. The sections only partially shown in FIG. 3 thereby surround the launch vehicle in a ring-like manner and the photovoltaic modules 12' are each arranged between the two connection lines 18a and 18 b, which are correspondingly spaced away from each other.

As is indicated as an example by the symbols "+" and "−", the connection lines 18a, 18b are each connected or are each to be connected to the pole of at least one electrical and/or electronic component (e.g., to an accumulator); the component can thereby be an accumulator to be separated from the payload for example, and/or part of the payload transported or to be transported by the launch vehicle.

The embodiment shown in FIG. 3 is particularly easy to manufacture, in particular, in the case of photovoltaic modules 12' applied to a smooth surface area as mentioned above and due to the visibility of the cable sections, faulty connections can be, in particular, well recognized and corrected.

A launch vehicle 1 is disclosed to transport at least one payload into an earth orbit, wherein the launch vehicle comprises a plurality of solar cells 122 on its outer surface 14. Furthermore, a manufacturing method for a launch vehicle 1 and a transport method for at least one payload using a launch vehicle 1 are disclosed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 1 launch vehicle
10 upper stage 11 payload fairing
12, 12' photovoltaic module
13 depression
14 outer surface of the launch vehicle
15 insulation
16 outer surface of a fuel tank or of a transitional structure
17 connection
18a, 18b connection line
20 propulsion stage
21 propulsion unit
22 boosters
121 solar field
122 solar cell
123 cable harness
124a, 124b connection line

The invention claimed is:

1. A launch vehicle to transport at least one payload into an earth orbit, wherein the launch vehicle comprises a plurality of solar cells the plurality of solar cells being integrated in at least one photovoltaic module set into at least one depression located in an insulation of the launch vehicle, wherein the at least one photovoltaic module comprises a plurality of connection lines bundled into a cable harness, and a connector is provided in the at least one depression; and,
wherein the plurality of solar cells comprises at least one solar cell, which is configured to be connected in a detachable manner comprising connecting the cable harness with said connector in the at least one depression to at least one of an electrical or an electronic component of at least one of a transported payload or a payload to be transported; or
wherein the plurality of solar cells comprises at least one solar cell, which is set up to be connected in a detachable or in a permanent manner comprising connecting the cable harness with said connector in the at least one depression to at least one accumulator, which is connected or connectable in a detachable manner to at least one of an electrical or an electronic component of at least one of a transported payload or a payload to be transported.

2. The launch vehicle according to claim 1, comprising a multistage rocket, wherein the plurality of solar cells are arranged on an upper stage of the multistage rocket.

3. The launch vehicle according to claim 1, wherein at least one of the solar cells is applied to a smooth area of the outer surface of the launch vehicle.

4. The launch vehicle according to claim 1, wherein at least one of the solar cells comprises an irradiation surface for sunlight of at least 10 $m^2$.

5. The launch vehicle according to claim 1, wherein at least two of the solar cells, together, comprise an irradiation surface for sunlight of at least 20 $m^2$.

6. The launch vehicle according to claim 1, wherein at least two of the solar cells, together, comprise an irradiation surface for sunlight of at least 50 $m^2$.

7. The launch vehicle according to claim 1, wherein at least one of the plurality of the solar cells comprise at least one solar cell that is configured as at least one of a pliable solar film,
at least one solar cell integrated into the pliable solar film, or
at least one organic solar cell.

8. A manufacturing method to manufacture a launch vehicle, comprising a step of attaching a plurality of solar cells to an outer surface of the launch vehicle,
wherein the plurality of solar cells is integrated in at least one photovoltaic module, which comprises a plurality of connection lines bundled into a cable harness and which is set into at least one depression located in an insulation of the launch vehicle, wherein a connector is provided in the at least one depression, and wherein the plurality of solar cells comprises:
at least one solar cell, which is configured to be connected in a detachable manner comprising connecting the cable harness with said connector in the depression to at least one of an electrical or an electronic component of at least one of a transported payload or a payload to be transported; or
at least one solar cell, which is set up to be connected in a detachable or in a permanent manner comprising connecting the cable harness with said connector in the depression to at least one accumulator, which is connected or connectable in a detachable manner to at least one of an electrical or an electronic component of at least one of a transported payload or a payload to be transported.

9. The manufacturing method according to claim 8, wherein at least one of the plurality of solar cells is applied to a smooth area of the outer surface.

10. The manufacturing method in accordance with claim 8, wherein the launch vehicle comprises a multistage rocket.

11. The manufacturing method according to claim 10, further comprising at least one of the following steps:
attaching at least one of the plurality of solar cells to a surface of an upper stage when manufacturing the upper stage, or
attaching at least one of the plurality of solar cells to the surface of the upper stage during an assembly process, in which two or a plurality of stages of the multistage rocket are assembled.

12. A transport method for at least one payload comprising:
transporting the at least one payload from a surface of the earth into an orbit using a launch vehicle according to claim 1.

13. The transport method according to claim 12, further comprising:
connecting at least one of an electrical or an electronic component of the at least one payload to the cable harness of the photovoltaic module integrating the plurality of solar cells or to an accumulator connected to the at least one photovoltaic module via the cable harness, and
supplying at least one electrical or electronic component during transport with energy obtained from the plurality of solar cells by means of solar radiation.

* * * * *